(12) United States Patent
Jung et al.

(10) Patent No.: US 12,267,552 B2
(45) Date of Patent: Apr. 1, 2025

(54) TRANSMISSION DEVICE

(71) Applicant: LG ELECTRONICS INC., Seoul (KR)

(72) Inventors: Sungbo Jung, Seoul (KR); Gibaek Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/016,644

(22) PCT Filed: Jul. 16, 2020

(86) PCT No.: PCT/KR2020/009406
§ 371 (c)(1),
(2) Date: Jan. 17, 2023

(87) PCT Pub. No.: WO2022/014752
PCT Pub. Date: Jan. 20, 2022

(65) Prior Publication Data
US 2023/0300405 A1 Sep. 21, 2023

(51) Int. Cl.
*H04N 21/258* (2011.01)
*H04N 21/414* (2011.01)
(Continued)

(52) U.S. Cl.
CPC . *H04N 21/43637* (2013.01); *H04N 21/41407* (2013.01); *H04N 21/42684* (2013.01)

(58) Field of Classification Search
None
See application file for complete search history.

(56) References Cited

U.S. PATENT DOCUMENTS 9,736,541 B1 * 8/2017 Nijim ............... H04N 21/41265
10,135,934 B2 11/2018 Park
(Continued)

FOREIGN PATENT DOCUMENTS

JP 6258077 1/2018
KR 1020120092469 8/2012
(Continued)

OTHER PUBLICATIONS

PCT International Application No. PCT/KR2020/009406, International Search Report dated Apr. 8, 2021, 4 pages.
(Continued)

*Primary Examiner* — Brian T Pendleton
*Assistant Examiner* — Jean D Saint Cyr
(74) *Attorney, Agent, or Firm* — LEE, HONG, DEGERMAN, KANG & WAIMEY

(57) ABSTRACT

An image transmission device according to an embodiment of the present disclosure may comprise: a short-range wireless communication module for wireless communication with a mobile terminal; and a processor for receiving identification information about an image reception device from the mobile terminal while paired with the mobile terminal, transmitting an unpairing request to the mobile terminal according to the reception of the identification information, and transmitting a pairing request to the image reception device, having the identification information, after terminating the pairing with the mobile terminal.

15 Claims, 10 Drawing Sheets

(51) Int. Cl.
    *H04N 21/418*    (2011.01)
    *H04N 21/426*    (2011.01)
    *H04N 21/43*     (2011.01)
    *H04N 21/4363*   (2011.01)
    *H04N 21/4402*   (2011.01)

(56) References Cited

U.S. PATENT DOCUMENTS

| | | | |
|---|---|---|---|
| 10,779,054 B2* | 9/2020 | Sundaram | H04N 21/64784 |
| 2016/0125733 A1* | 5/2016 | Sallas | G08C 17/02 |
| | | | 398/106 |
| 2018/0205983 A1 | 7/2018 | Lee et al. | |
| 2021/0011702 A1* | 1/2021 | Pal | H04N 21/436 |

FOREIGN PATENT DOCUMENTS

| | | |
|---|---|---|
| KR | 20170004482 | 1/2017 |
| KR | 1020170023245 | 3/2017 |
| KR | 20180123863 | 11/2018 |
| KR | 102036384 | 10/2019 |
| KR | 1020200014205 | 2/2020 |

OTHER PUBLICATIONS

Korean Intellectual Property Office Application No. 10-2022-7041528, Notice of Allowance dated Oct. 30, 2024, 2 pages.

\* cited by examiner

TRANSMISSION DEVICE

CROSS-REFERENCE TO RELATED APPLICATIONS

This application is the National Stage filing under 35 U.S.C. 371 of International Application No. PCT/KR2020/009406, filed on Jul. 16, 2020, the contents of which are all incorporated by reference herein in their entirety.

TECHNICAL FIELD

The present disclosure relates to a transmitting device for wirelessly transmitting A/V data.

BACKGROUND ART

As image technology changes from analog to digital, development has been made from SD (Standard-Definition) to HD (Hi-Definition) to provide an image closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (MD) beyond Full HD. UHD, which supports high image quality and ultra-high resolution, is spotlighted as a next-generation media environment. The UHD supports 4K (3840×2160) or 8K (7680×4320) resolutions and up to 22.2 channels of surround audio. The UHD provides 4 times clearer picture quality compared to the HD, even on the basis of 4K UHD, and 8K UHD provides 16 times clearer picture quality compared to the HD.

For Wi-Fi or Bluetooth connection, a user checks a list of devices found by a device on a screen of the device and selects a device to be paired to perform a pairing process.

However, in a wireless display system in which a System On Chip (SoC) exists only on the side of a transmission unit that transmits A/V data, there is no screen in the transmission unit, making it difficult for the user to recognize a device list.

In addition, there is no processor capable of controlling the pairing of a short-distance communication module on the side of a receiver that receives the A/V data, making it difficult to establish a wireless connection by the receiver itself.

DISCLOSURE

Technical Problem

An object of the present disclosure is to facilitate pairing between a transmitting device and a receiving device when pairing between the transmitting device and the receiving device is lost in a wireless display system.

An object of the present disclosure is to enable simple pairing between a transmitting device and a receiving device using a mobile terminal when pairing between the transmitting device and the receiving device is lost in a wireless display system.

Technical Solution

According to an embodiment of the present disclosure, an image transmission device includes a short-range wireless communication module configured to perform wireless communication with a mobile terminal, and a processor configured to receive identification information of an image reception device from a mobile terminal while being paired with the mobile terminal, transmit an unpairing request to the mobile terminal in response to reception of the identification information, and request a pairing request to the image reception device having he identification information after being unpaired from the mobile terminal.

According to an embodiment of the present disclosure, a wireless display system includes an image transmission device, an image reception device, and a mobile terminal, wherein the mobile terminal is configured to receive identification information of the image reception device from the image reception device and transmit the received identification information to the image transmission device, in a state in which the the mobile terminal is paired with the image transmission device, and the image transmission device is configured to transmit an unpairing request to the mobile terminal in response to reception of the identification information, and transmit a pairing request to the image reception device having the identification information after the image transmission device has been unpaired with the mobile terminal.

Advantageous Effects

According to an embodiment of the present disclosure, a user can easily connect an image reception device to an image transmission device wirelessly merely by tagging a mobile terminal with the image reception device.

Accordingly, a complicated wireless connection process is not required, and user convenience can be greatly improved.

MODE FOR INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

An image transmission device according to an embodiment of the present invention, for example, as an artificial device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, an image transmission device described herein, for example, can perform various user-friendly functions.

Figure 1:
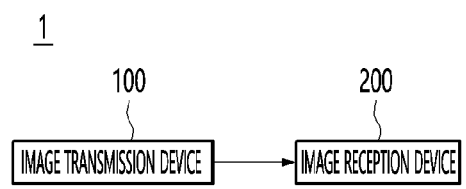
FIGS. 1 and 3 are diagrams for describing a configuration of a display system according to an embodiment of the present disclosure.
Figure 2:
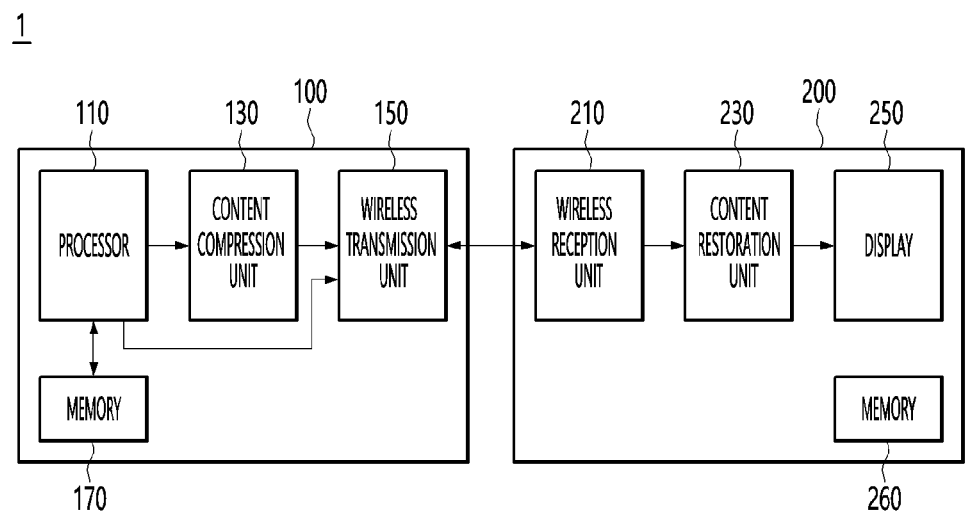
Figure 3:
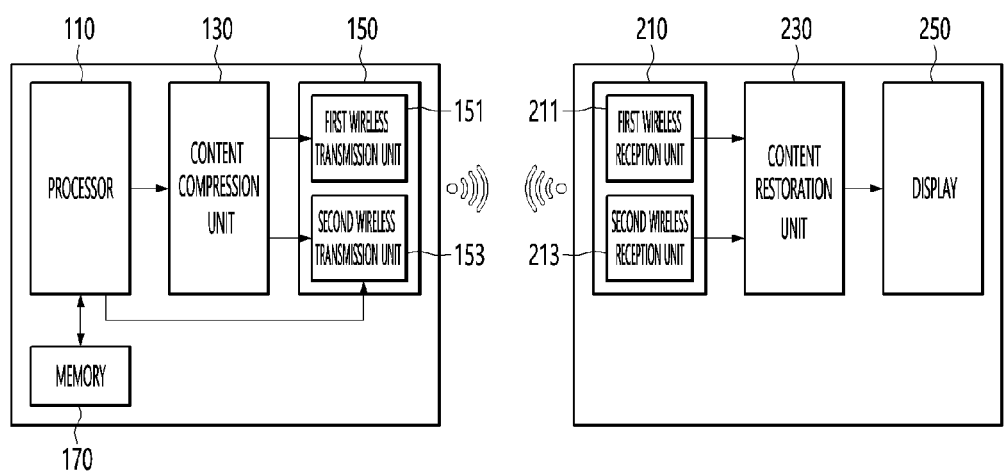

FIGS. 1 to 3 are diagrams for describing a configuration of a display system according to an embodiment of the present disclosure.

Referring to FIG. 1, a display system 1 according to an embodiment of the present disclosure may include an image transmission device 100 and an image reception device 200.

The image transmission device 100 may be a device capable of encoding a content video and audio and transmitting the encoded content video and audio in a wireless manner.

The image transmission device 100 may be a set-top box.

The image reception device 200 may be a display apparatus capable of wirelessly receiving an encoded content video and audio and decoding the received content video and audio.

The image transmission device 100 and the image reception device 200 may constitute a video wall display system.

In a video wall, a display having a thin bezel plays an important role in the visualization of content images. For a thin bezel of a display, it is efficient that components capable of minimal functions are only provided and a circuit or a component for a main function is provided in a separate device.

The image transmission device 100 may determine a type of the content image input from the outside, and determine a compression ratio of the content image based on the determined type. The compression ratio of the content image may refer to a compression ratio of the data size of the content image.

The type of the content image may include a still image type, a general video type, and a game video type.

The image transmission device 100 may compress the content image according to the determined compression ratio, and wirelessly transmit the compressed content image to the image reception device 200.

The image reception device 200 may restore the compressed content video received from the image transmission device 100 and display the restored content image on the display.

FIG. 2 is a block diagram illustrating detailed configurations of the image transmission device 100 and the image reception device 200.

Referring to FIG. 2, the image transmission device 100 may include a processor 110, a content compressor 130, a first wireless communication unit 150, and a memory 170.

The processor 110 may control overall operation of the image transmission device 100. The processor 110 may be configured in the form of a system on chip (SoC).

A plurality of processors 110 may be provided.

The processor 110 may determine a compression rate for audio or video input from the outside according to a type of content video, and transfer one or more of audio or video to the content compressor 130 according to the determined compression rate.

The content compression unit 130 may change the compression ratio of the content image according to a radio quality to compensate for the loss of the content image or the disconnection of wireless connection. The content image may include one or more of audio and video.

When a radio quality is poor, the content compressor 130 may decrease a data transmission rate (increase the compression rate).

When a radio quality is good, the content compressor 130 may increase a data transmission rate (decrease the compression rate).

The content compressor 130 may be referred to as an encoder.

The first wireless communication unit 150 may wirelessly transmit the content video compressed by the content compressor 130 to an image reception device 200.

The memory 170 may store one or more signal patterns used to synchronize an AV signal and a control signal matching the AV signal.

Referring to FIG. 3, the first wireless communication unit 150 may include a first wireless transmission unit 151 and a second wireless transmission unit 153.

The first wireless communication unit 150 may transmit the compressed content video to the second wireless communication unit 210 of the image reception device 200 through two channels.

That is, each of the first wireless transmission unit 151 and the second wireless transmission unit 153 may transmit the compressed content image to a first wireless receiver 211 and a second wireless receiver 213 of the image reception device 200, individually.

In an embodiment, the reason for using 2 channels is to reduce transmission delay by transmitting a compressed content image through a channel having a better radio quality.

In another embodiment, the reason for using 2 channels may be to divide and transmit the content image through 2 channels because a content image having a 4K resolution has a large data capacity.

Each of the first wireless transmission unit 151 and the second wireless transmission unit 153 may include a baseband module for baseband communication and an RF module for RF communication.

The baseband module may generate unmodulated low frequency band data for the compressed content image and transmit the data to the RF module.

The RF module may convert the low frequency band data into high frequency band data according to a radio frequency (RF) communication standard, and transmit the converted data for the content image to the image reception device 200.

The image reception device 200 may include a second wireless communication unit 210, a content restoration unit 230, and a display 250.

The second wireless communication unit 210 may include a first wireless receiver 211 and a second wireless receiver 213.

That is, the second wireless communication unit 210 may also be configured with two channels.

Each of the first wireless receiver 211 and the second wireless receiver 213 may include a baseband module for baseband communication and an RF module for RF communication.

The RF module may receive the high frequency band data from the image transmission device 100 according to a radio frequency (RF) communication standard.

The baseband module may convert the high frequency band data into low frequency band data.

The content restoration unit 230 may decode the content video received through the second wireless communication unit 210.

The content restoration unit 230 may restore the compressed content image to a content image having an original size.

The content restoration unit 230 may include a decoder.

The display 250 may display the restored content image.

The image reception device 200 may further include a memory 260. The image reception device 200 may store information received from the image transmission device 100 and a program for executing an application.

Figure 4:
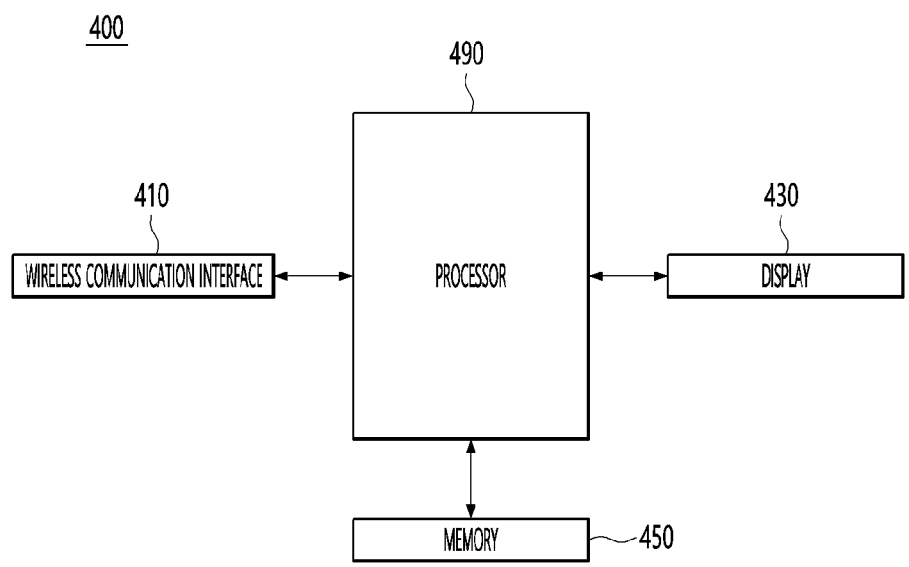
FIG. 4 is a ladder diagram for describing a method of operating a display system according to an embodiment of the present disclosure.

FIG. 4 is a block diagram for describing a configuration of a mobile terminal according to an embodiment of the present disclosure.

Referring to FIG. 4, a mobile terminal 400 may include a wireless communication interface 410, a display 430, a memory 450, and a processor 490.

The wireless communication interface 410 may be an interface for performing wireless communication with the image transmission device 100 or the image reception device 200.

The wireless communication interface 410 may include a short-range communication module for Bluetooth standard, Wi-Fi standard, and NFC standard.

The display 430 may display information processed by the mobile terminal 400. For example, the display 430 may display execution screen information of an application program running on the mobile terminal 400, or UI (User Interface) or Graphic User Interface (GUI) information according to the execution screen information.

The display 430 may be implemented in the form of a touch screen.

The memory 450 may store a program for operation of the processor 490, and temporarily store input/output data.

The memory 450 may store data about vibration and sound of various patterns output when a touch is input on the touch screen.

The processor 490 may control operation related to an application program and generally control overall operation of the mobile terminal 400.

Figure 5:
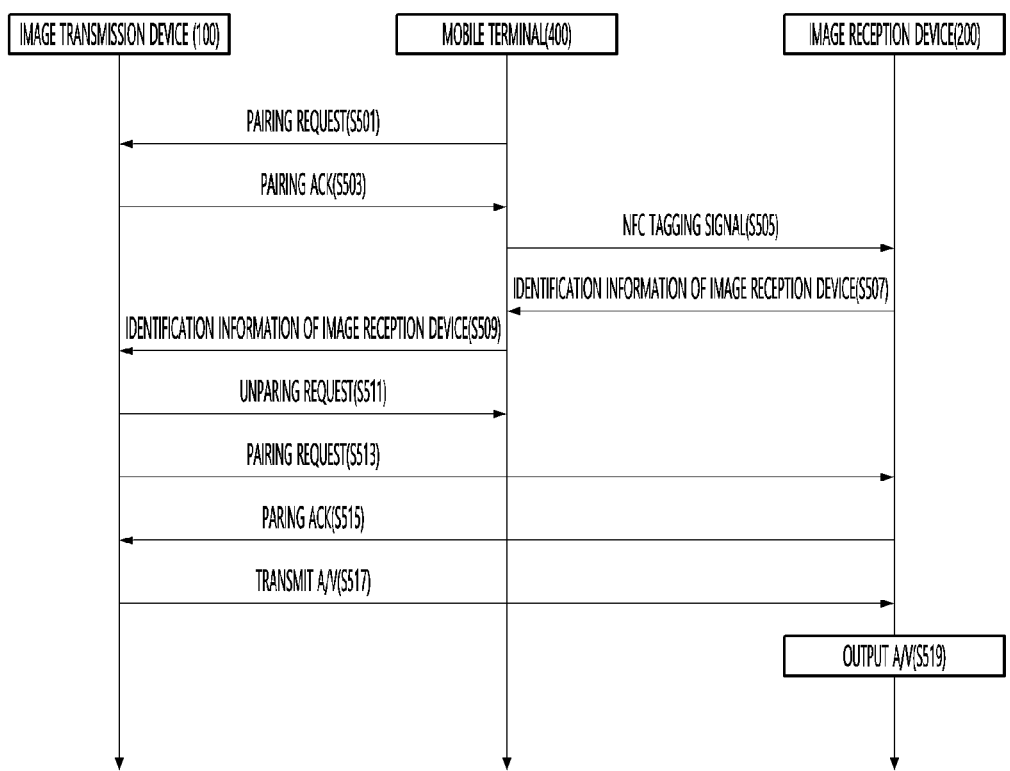
FIG. 5 is a ladder diagram for describing a method of operating a display system according to an embodiment of the present disclosure.

FIG. 5 is a ladder diagram for describing a method of operating a display system according to an embodiment of the present disclosure.

A display system according to another embodiment of the present disclosure may include an image transmission device 100, an image reception device 200 and a mobile terminal 400.

The mobile terminal 400 may be used to re-perform pairing when pairing between the image transmission device 100 and the image reception device 200 is disconnected.

Hereinafter, wireless communication may be performed between the image transmission device 100 and the mobile terminal 400 according to the Bluetooth standard, and wireless communication may be also performed between the image transmission device 100 and the image reception device 200 according to the Bluetooth standard.

Referring to FIG. 5, the processor 490 of the mobile terminal 400 may transmit a pairing request to the image transmission device 100 (S501).

The processor 490 of the mobile terminal 400 may receive a user input for activating Bluetooth communication, and display a device list including a plurality of connectable devices according to the received user input.

The processor 490 of the mobile terminal 400 may receive a user input for selecting the image transmission device 100 included in the device list, and transmit a pairing request to the image transmission device 100 according to the received user input.

The pairing request may be a request for Bluetooth connection between the mobile terminal 400 and the image transmission device 100.

Under the control of the processor 110 of the image transmission device 100, the wireless transmission unit 150 may transmit a pairing ack (Acknowledge) to the mobile terminal 400 in response to the pairing request received from the mobile terminal 400 (S503).

The processor 110 of the image transmission device 100 may transmit a pairing response (or pairing ack) for permitting Bluetooth connection to the mobile terminal 400 in response to the pairing request for Bluetooth connection received from the mobile terminal 400.

According to the pairing ack, the image transmission device 100 and the mobile terminal 400 may be connected via Bluetooth.

Then, the processor 490 of the mobile terminal 400 may transmit a Near Field Communication (NFC) tagging signal to the image reception device 200 through the wireless communication interface 410 (S505).

That is, a user may perform a tagging operation by positioning the mobile terminal 400 adjacent to the image reception device 200.

Each of the wireless communication interface 410 of the mobile terminal 400 and the wireless receiver 210 of the image reception device 200 may include an NFC circuit for near field communication (NFC).

The user may tag the mobile terminal 400 with the image reception device 200 to obtain identification information of the image reception device 200.

The NFC tagging signal may be a signal requesting identification information of the image reception device 200.

The identification information of the image reception device 200 is information for identifying the image reception device 200 and may include one or more of a serial number and a MAC address.

The image reception device 200 may store unique identification information for identifying the image reception device 200 itself. The unique identification information may include one or more of the serial number and the MAC address.

The image reception device 200 may transmit the identification information of the image reception device 200 to the mobile terminal 400 through the wireless receiver 210 in response to the NFC tagging signal received from the mobile terminal 400 (S570).

The mobile terminal 400 may transmit the NFC tagging signal to the image reception device 200, and the image reception device 200 may transmit at least one of the serial number and the MAC address to the mobile terminal 400 in response to the NFC tagging signal.

The processor 490 of the mobile terminal 400 may transmit the identification information of the image reception device 200 received from the image reception device 200 to the image transmission device 100 through the wireless communication interface 410 (S509).

The processor 490 of the mobile terminal 400 may transmit the identification information of the image reception device 200 to the paired image transmission device 100 through a Bluetooth module included in the wireless communication interface 410.

The mobile terminal 400 may transmit the identification information of the image reception device 200 to the image transmission device 100 to pair the image transmission device 100 and the image reception device 200.

The processor 110 of the image transmission device 100 may transmit a unpairing request to the mobile terminal 400 through the wireless transmission unit 150 (S511).

The processor 110 of the image transmission device 100 may transmit the unpairing request to the mobile terminal 400 for pairing with the image reception device 200, by using the identification information of the image reception device 200 received from the mobile terminal 400.

The unpairing request may be a request for requesting the image transmission device 100 to disconnect the Bluetooth connection with the mobile terminal 400.

The Bluetooth connection is able to be established between only two devices. The image transmission device 100 may disconnect from the mobile terminal 400 for Bluetooth connection with the image reception device 200.

When receiving the identification information of the image reception device 200 from the mobile terminal 400, the processor 110 of the image transmission device 100 may recognize the reception of the identification information as a trigger for unpairing with the mobile terminal 400.

After being unpaired from the mobile terminal 400, the processor 110 of the image transmission device 100 may transmit a pairing request to the image reception device 200 through the wireless transmission unit 150 (S513).

After the Bluetooth connection with the mobile terminal 400 is released, the processor 110 of the image transmission device 100 may transmit a pairing request to the image reception device 200 through the wireless transmission unit 150.

The processor 110 of the image transmission device 100 may transmit a pairing request to the image reception device 200 having the identification information by using identification information of the image reception device 200.

The pairing request may include the identification information of the image reception device 200 and a message requesting the Bluetooth connection with the image transmission device 100.

The processor 110 of the image transmission device 100 may receive a pairing ack from the image reception device 200 through the wireless transmitting unit 150 (S515).

The processor 110 of the image transmission device 100 may receive the pairing ack in response to the pairing request transmitted to the image reception device 200.

The pairing ack may include a message for permitting the image reception device 200 to establish Bluetooth connection with the image transmission device 100.

When the Bluetooth connection between the image transmission device 100 and the image reception device 200 is completed, the image transmission device 100 may serve as a source device and the image reception device 200 may serve as a sink device.

The source device may be a device that transmits A/V data, and the sink device may be a device that receives and outputs the A/V data transmitted by the source device.

The processor 110 of the image transmission device 100 may transmit Audio/Video (A/V) to the image reception device 200 through the wireless transmitting unit 150 (S517).

The processor 110 of the image transmission device 100 may transmit compressed A/V data to the image reception device 200 after the Bluetooth connection with the image reception device 200 has been established.

The image reception device 200 may output the A/V received from the image transmission device 100 (S519).

The image reception device 200 may decompress the received A/V data, display decompressed video data through the display 250, and output decompressed audio data through a speaker (not shown).

As described above, according to an embodiment of the present disclosure, a wireless connection between the image transmission device 100 and the image reception device 200 may be automatically established in such a way that a user merely tags the mobile terminal 400 with the image reception device 200.

That is, a wireless connection between the image transmission device 100 and the image reception device 200 can be easily established without the user needing to set up a complicated wireless connection, resulting in great improvement in user convenience.

FIGS. 6 to 11 are diagrams for describing a process of performing pairing between an image transmission device and an image reception device using a mobile terminal according to an embodiment of the present disclosure.

In FIGS. 6 to 11, it is assumed that the image transmission device 100 and the mobile terminal 400 are capable of Bluetooth communication with each other, and that the image transmission device 100 and the image reception device are capable of Bluetooth communication with each other.

Also, it is assumed that the image reception device 200 and the mobile terminal 400 are capable of NFC communication.

Figure 6:
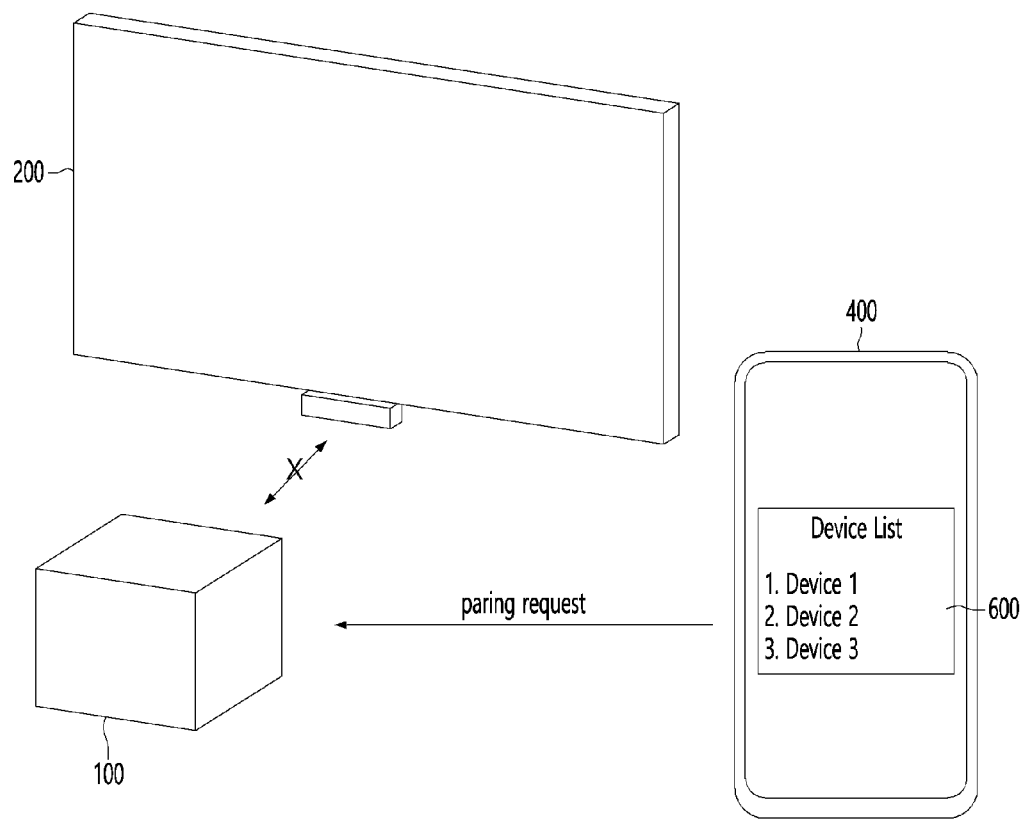
FIGS. 6 to 11 are diagrams for describing a process of performing pairing between an image transmission device and an image reception device using a mobile terminal according to an embodiment of the present disclosure.

In FIG. 6, the Bluetooth connection has not established between the image transmission device 100 and the image reception device 200.

The mobile terminal 400 may transmit a pairing request for Bluetooth connection to the image transmission device 100. A user selects a button for activating the Bluetooth communication of the mobile terminal 400, and according to the selection of the button, the mobile terminal 400 may display a device list 600 including devices capable of Bluetooth connection.

The device list 600 may include a plurality of devices connectable to the mobile terminal 400 through Bluetooth communication.

The user may select the image transmission device 100 from among the plurality of devices.

The mobile terminal 400 may transmit the pairing request to the selected image transmission device 100.

The image transmission device 100 may transmit a pairing ack to the mobile terminal 400 in response to the pairing request received from the mobile terminal 400.

Figure 7:
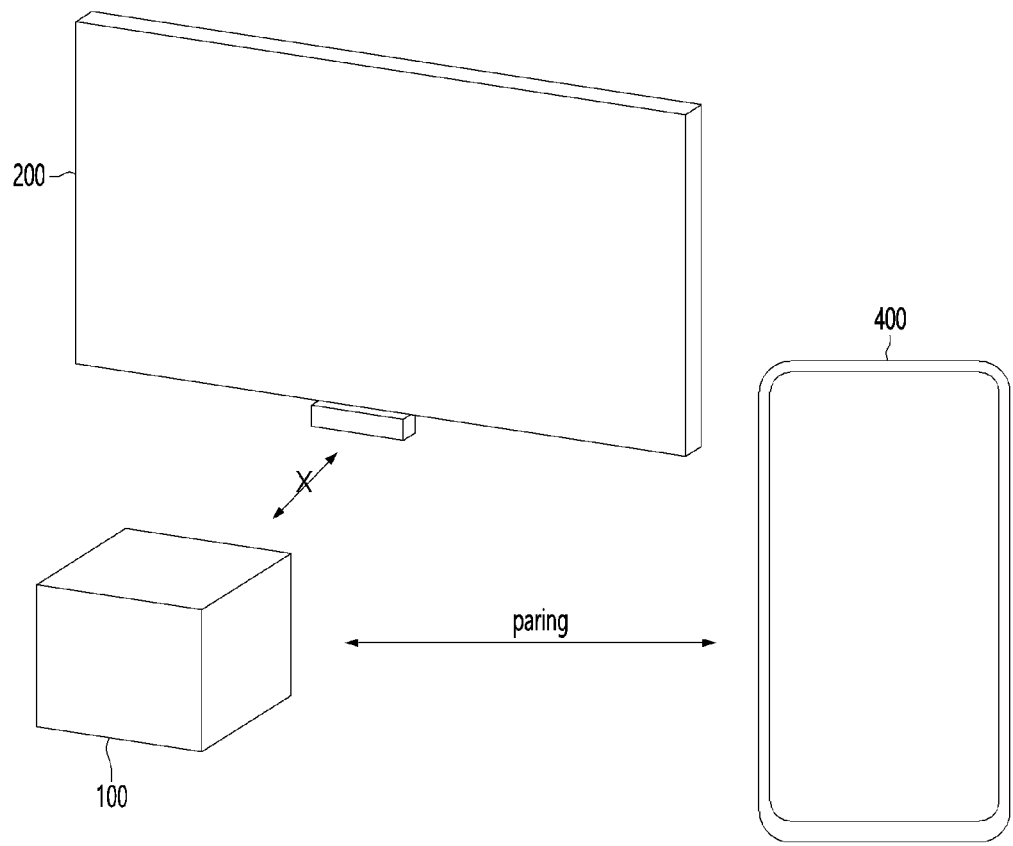

Accordingly, as shown in FIG. 7, the Bluetooth connection between the image transmission device 100 and the mobile terminal 400 may have been established.

A System On Chip (SoC) may be provided in the image transmission device 100 alone. That is, the SoC may be provided in the processor 110 of the image transmission device 100 alone, and may not be provided in the image reception device 200.

In a wireless display system, since the image reception device 200 only serves to output A/V data, a processor having high-performance arithmetic processing capability, such as an SoC, may not be provided.

In the case of the image transmission device 100, it is difficult for a user to recognize which devices are connectable to the image transmission device 100 because the image transmission device 100 does not include a display.

In addition, in the case of the image reception device 200, there is a limitation in performing a wireless connection with the image transmission device 100 by the image reception device 200 itself because there is no SoC capable of controlling the pairing of the wireless receiver 210.

As described above, to facilitate wireless connection between the image transmission device 100 and the image reception device 200, the mobile terminal 400 may be used.

Figure 8:
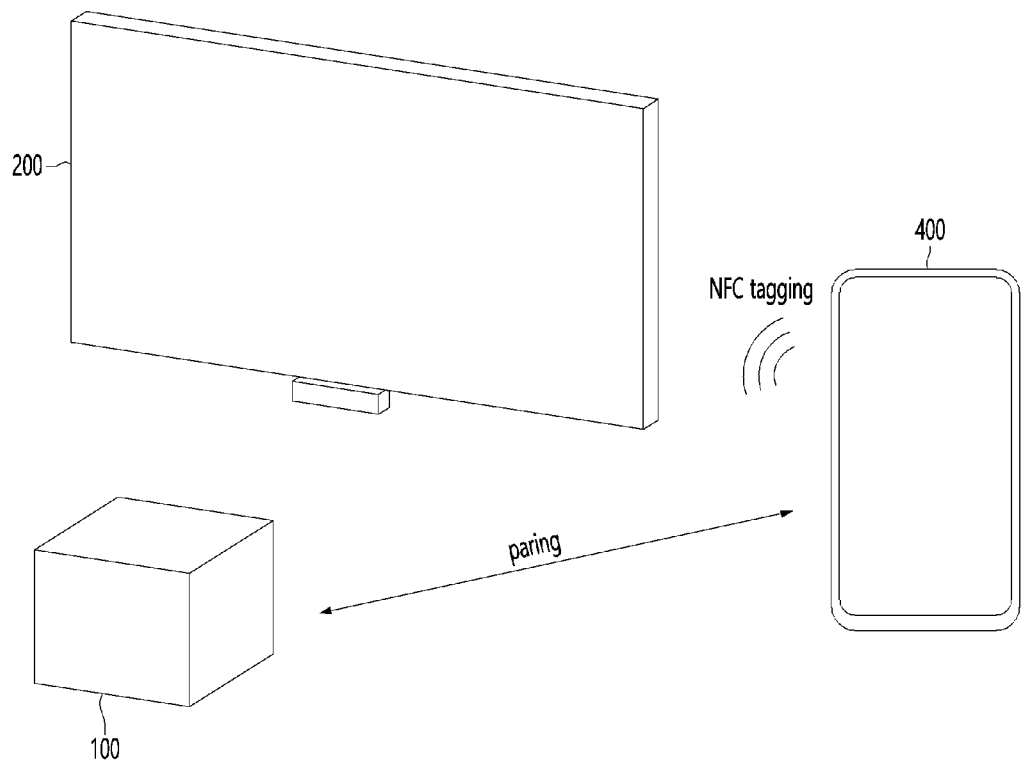

Referring to FIG. 8, a user may take an action of tagging the mobile terminal 400 with the image reception device 200. Accordingly, the mobile terminal 400 may transmit an NFC tagging signal to the image reception device 200.

Figure 9:
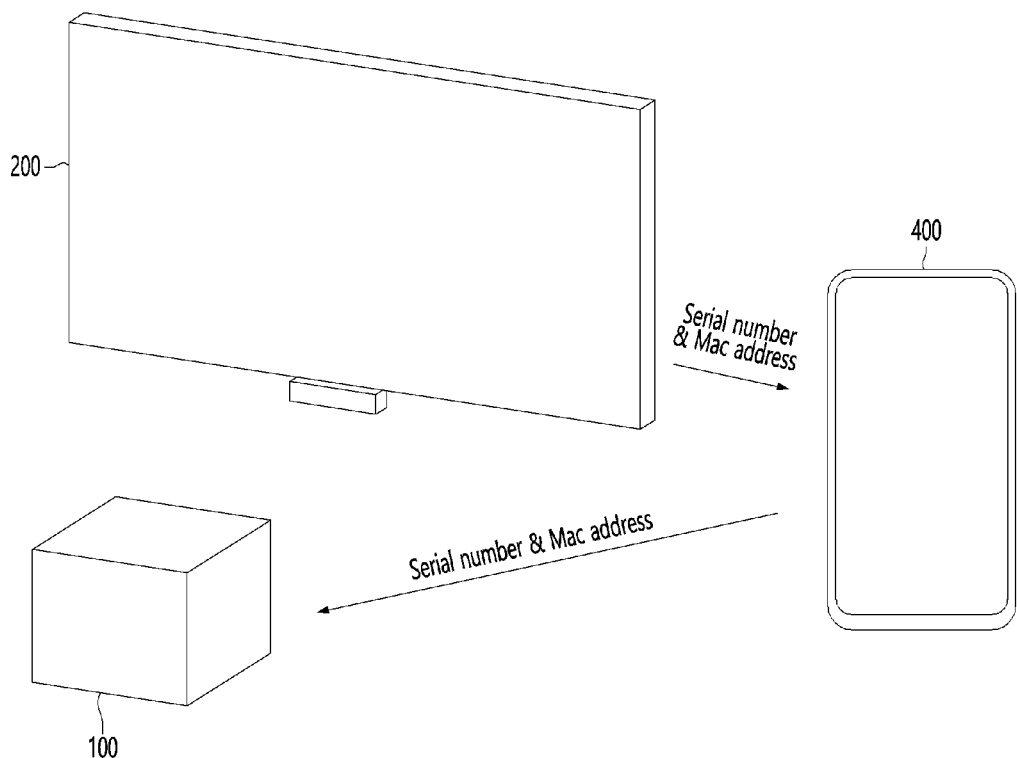
Figure 10:
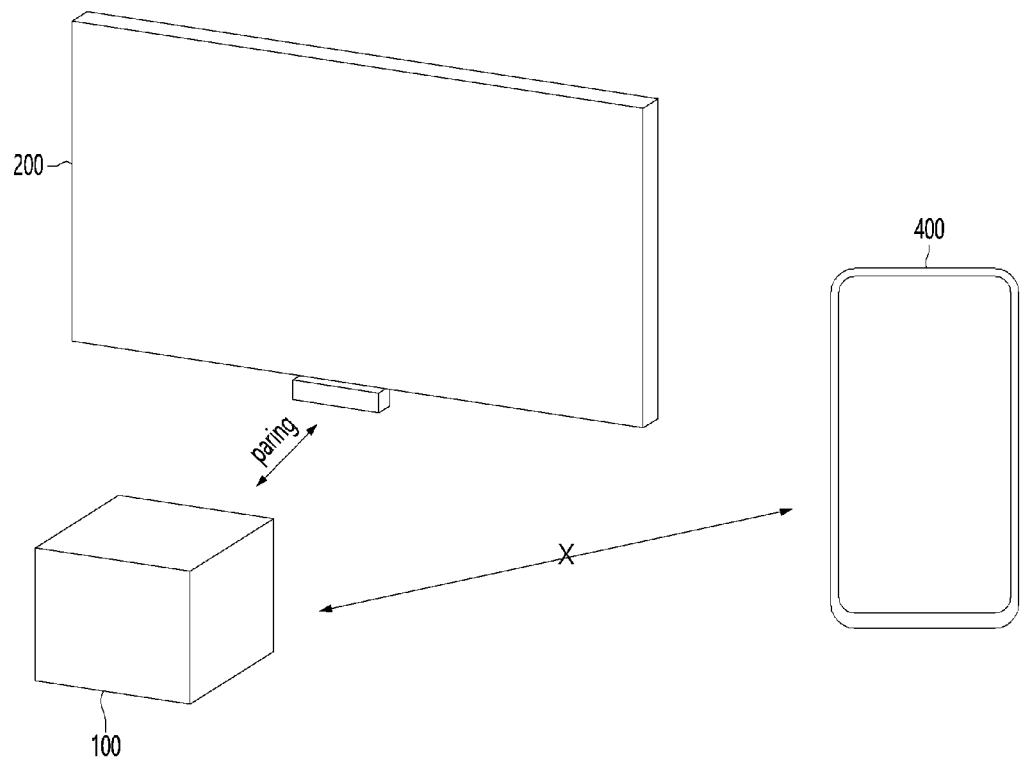
Figure 11:
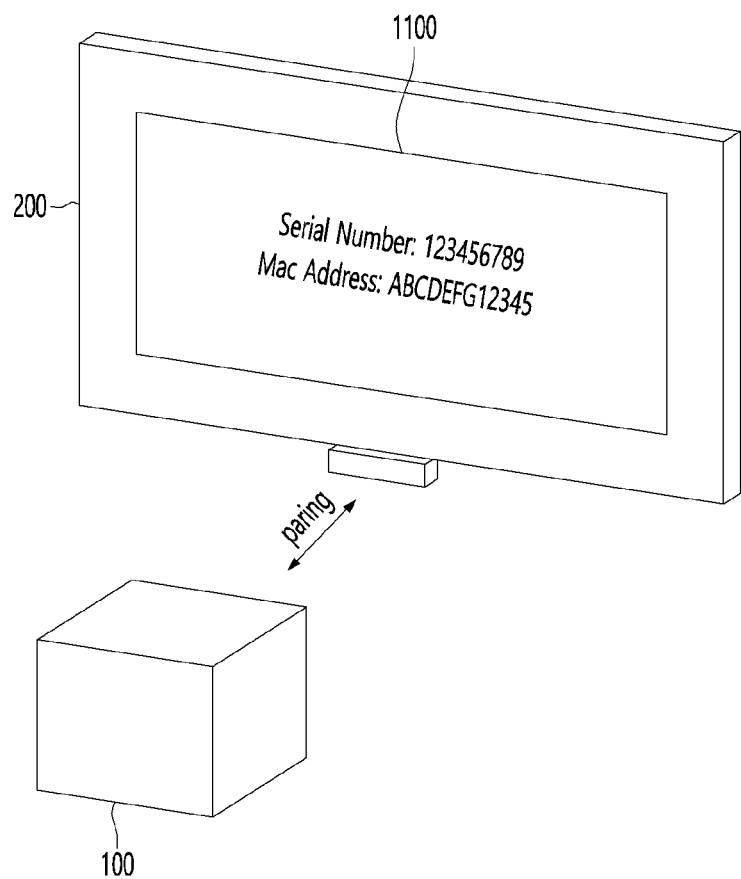

Referring to FIG. 9, the image reception device 200 may transmit the identification information of the image reception device 200 to the mobile terminal 400 in response to the NFC tagging signal received from the mobile terminal 400. The identification information of the image reception device 200 may include one or more of a serial number and a MAC address.

The mobile terminal 400 may transmit the identification information received from the image reception device 200 to the paired image transmission device 100. The reason for this is that it is difficult for the image transmission device 100 to obtain the identification information of the image reception device 200 by itself because the connection with the image reception device 200 is lost.

The image transmission device 100 may transmit an unpairing request to the mobile terminal 400 after receiving the identification information of the image reception device 200 from the mobile terminal 400.

According to the unpairing request, the Bluetooth connection between the mobile terminal 400 and the image transmission device 100 may be lost.

The image transmission device 100 may transmit a pairing request to the image reception device 200, using the identification information received from the mobile terminal 400.

When the image reception device 200 transmits a pairing ack to the image transmission device 100 in response to the pairing request, as shown in FIG. 1, the image transmission device 100 may be paired with the image reception device 200.

As such, when the wireless connection between the image transmission device 100 and the image reception device 200 is lost, a user may easily connect the image transmission device 100 and the image reception device 200 wirelessly using the mobile terminal 400.

Meanwhile, when the image transmission device 100 transmits a pairing request to the image reception device 200, the image reception device 200 may display a window 1100 including its serial number and MAC address on a display.

The pairing request transmitted from the image transmission device 100 to the image reception device 200 may include one or more of the serial number and MAC address of the image reception device 200.

The user may identify whether the serial number and MAC address displayed on the display of the image reception device 200 actually matches the identification information of the image reception device 200.

Figure 12:
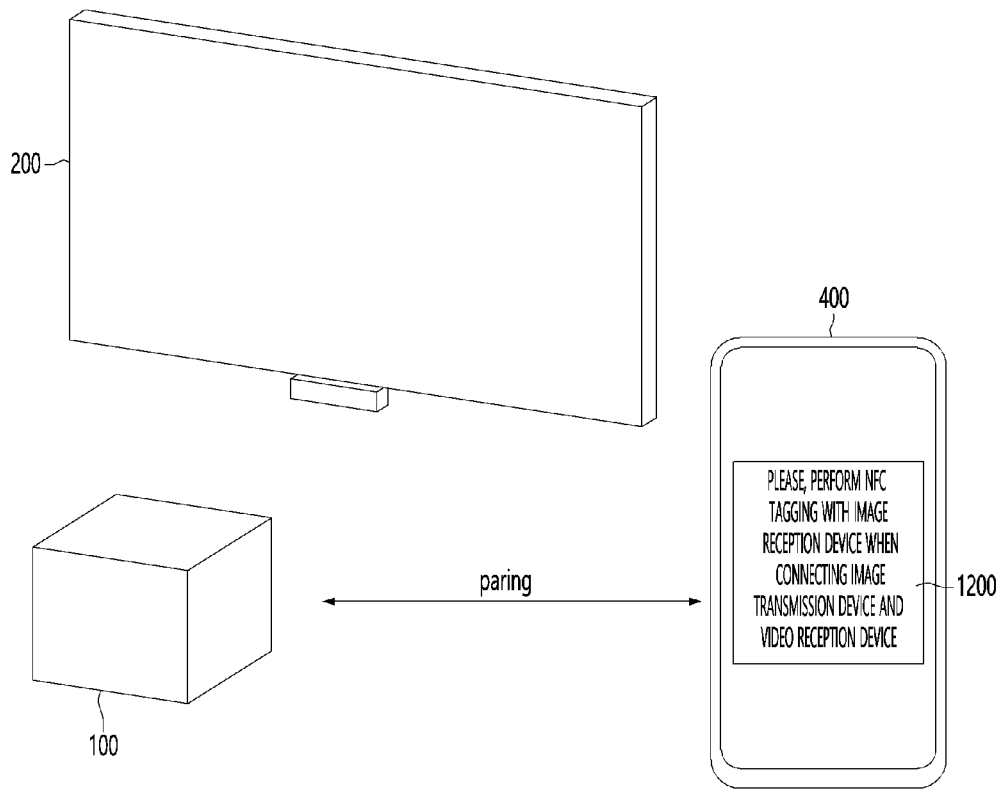
FIG. 12 is a diagram for describing an example of guiding a wireless connection between an image transmission device and an image reception device according to an embodiment of the present disclosure.

FIG. 12 is a diagram for describing an example of guiding a wireless connection between an image transmission device and an image reception device according to an embodiment of the present disclosure.

In FIG. 12, it is assumed that the image transmission device 100 and the image reception device 200 are disconnected via Bluetooth, and the image transmission device 100 and the mobile terminal 400 are connected via Bluetooth. That is, the situation of FIG. 12 is the same as that of FIG. 7.

The mobile terminal 400 may display a guide 1200 to perform an NFC tagging operation on a target device for wireless connection with the image transmission device 100 in a state of being paired with the image transmission device 100.

A user may perform NFC tagging on the image reception device 200, which is a target device for wireless connection with the image transmission device 100, according to the guide 1200.

That is, the guide 1200 may induce the user to tag the image transmission device 100 with a pairing target device.

The user can easily connect a desired device to the image transmission device 100 by performing the NFC tagging operation on a target device to be connected to the image transmission device 100 according to the guide 1200.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The image transmission device as described above is not limited to the configuration and method of the above-described embodiments, but the embodiments may be configured by selectively combining all or part of each embodiment such that various modifications can be made.

The invention claimed is:

1. An image transmission device comprising:
a short-range wireless communication module configured to perform wireless communication with a mobile terminal; and
a processor configured to:
receive identification information of an image reception device from a mobile terminal while being paired with the mobile terminal;
recognize the reception of the identification information of the image reception device as a trigger for unpairing with the mobile terminal;
based on the recognition, transmit an unpairing request to the mobile terminal;
request a pairing request to the image reception device corresponding to the identification information after being unpaired from the mobile terminal; and
perform wireless communication with the image reception device having the identification information.

2. The image transmission device of claim 1, wherein the processor is further configured to receive a pairing response in response to the pairing request from the image reception device, and transmit audio/video (A/V) data to the image reception device after being paired with the image reception device.

3. The image transmission device of claim 1, wherein the identification information of the image reception device includes at least one of a serial number or a Mac address of the image reception device.

4. The image transmission device of claim 1, wherein the short-distance wireless communication module includes a Bluetooth communication module for the Bluetooth standard.

5. The image transmission device of claim 1, wherein the processor is further configured to receive a pairing request for pairing from the mobile terminal in a state in which wireless connection with the image reception device is lost, and transmit a pairing response in response to the pairing request to the mobile terminal.

6. The image transmission device of claim 1, wherein the image transmission device is a set-top box.

7. A wireless display system comprising:
an image transmission device;
an image reception device; and
a mobile terminal,
wherein the mobile terminal is configured to receive identification information of the image reception device from the image reception device and transmit the received identification information to the image transmission device, in a state in which the mobile terminal is paired with the image transmission device, and
wherein the image transmission device is configured to:
recognize a reception of the identification information of the image reception device from the mobile terminal as a trigger for unpairing with the mobile terminal;
based on the recognition, transmit an unpairing request to the mobile terminal;
transmit a pairing request to the image reception device corresponding to the identification information after the image transmission device has been unpaired with the mobile terminal; and
perform wireless communication with the image reception device having the identification information.

8. The wireless display system of claim 7, wherein the image transmission device is further configured to receive a pairing response in response to the pairing request from the image reception device, and transmit audio/video (A/V) data to the image reception device after being paired with the image reception device.

9. The wireless display system of claim 7, wherein the identification information of the image reception device includes at least one of a serial number or a Mac address of the image reception device.

10. The wireless display system of claim 7, wherein the image transmission device and the mobile terminal perform communication according to a Bluetooth communication standard, and
wherein the mobile terminal and the image reception device perform communication according to a Near Field Communication (NFC) standard.

11. The wireless display system of claim 10, wherein the mobile terminal is further configured to transmit an NFC tagging signal to the image reception device and receive the identification information in response to the NFC tagging signal.

12. The wireless display system of claim 7, wherein the image transmission device is further configured to receive a pairing request for pairing from the mobile terminal in a state in which wireless connection with the image reception device is lost, and transmit a pairing response in response to the pairing request to the mobile terminal.

13. The wireless display system of claim 7, wherein the image transmission device is a set-top box including a system on chip (SoC) and equipped with no display, and
wherein the image reception device is a display device including no System On Chip (SoC) and equipped with a display.

14. The wireless display system of claim 7, wherein the mobile terminal is further configured to display a guide for inducing the mobile terminal to be tagged with a connection target device of the image transmission device in a state in which the mobile terminal is paired with the image transmission device.

15. The wireless display system of claim 7, wherein the image reception device is configured to display the identification information after the image reception device has been paired with the image transmission device.

* * * * *